US010379976B2

(12) United States Patent
Tian et al.

(10) Patent No.: US 10,379,976 B2
(45) Date of Patent: Aug. 13, 2019

(54) AUTOMATIC SWITCHING METHOD AND AUTOMATIC SWITCHING SYSTEM

(71) Applicant: Nuctech Company Limited, Beijing (CN)

(72) Inventors: Long Tian, Beijing (CN); Tao Wang, Beijing (CN); Hongzhi Ning, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 0 days.

(21) Appl. No.: 15/129,978

(22) PCT Filed: Dec. 21, 2015

(86) PCT No.: PCT/CN2015/098079
§ 371 (c)(1),
(2) Date: Sep. 28, 2016

(87) PCT Pub. No.: WO2016/107438
PCT Pub. Date: Jul. 7, 2016

(65) Prior Publication Data
US 2017/0288891 A1 Oct. 5, 2017

(30) Foreign Application Priority Data
Dec. 29, 2014 (CN) .......................... 2014 1 0838463

(51) Int. Cl.
*H04L 12/24* (2006.01)
*G06F 11/20* (2006.01)
(Continued)

(52) U.S. Cl.
CPC .......... *G06F 11/2092* (2013.01); *G06F 11/20* (2013.01); *G06F 11/2094* (2013.01);
(Continued)

(58) Field of Classification Search
None
See application file for complete search history.

(56) References Cited

U.S. PATENT DOCUMENTS

2005/0034014 A1* 2/2005 Moser ................. G06F 9/485
714/17
2006/0026250 A1* 2/2006 Ito .......................... H04L 51/22
709/206
(Continued)

FOREIGN PATENT DOCUMENTS

CN          1851657 A       10/2006
CN      1 02231681 A       11/2011
(Continued)

OTHER PUBLICATIONS

Nakjima Yutaka, translation of JP 2004-032103, published Jan. 29, 2004, 7 pages.*
(Continued)

*Primary Examiner* — Joshua Joo
(74) *Attorney, Agent, or Firm* — Scully, Scott, Murphy & Presser, P.C.

(57) ABSTRACT

The present disclosure relates to an automatic switching method and an automatic switching system. The automatic switching method includes: an automatic switching device monitoring in real time a service state of an operation server; when the automatic switching device monitors that the operation server has terminated providing service for a client terminal, the automatic switching device sending to the operation server a switching instruction for switching a current configuration of the operation server and sending to a backup server a notification message for switching a current configuration of the backup server; and the backup server switching the current configuration of the backup server to a preset first configuration according to the notification message, and providing service for the client termi-
(Continued)

nal; wherein the first configuration is the configuration of the operation server when the operation server provided service.

11 Claims, 6 Drawing Sheets

(51) Int. Cl.
*H04L 29/08* (2006.01)
*H04L 12/26* (2006.01)
*H04L 29/14* (2006.01)

(52) U.S. Cl.
CPC .......... *H04L 41/00* (2013.01); *H04L 41/0668* (2013.01); *H04L 43/0817* (2013.01); *H04L 67/1034* (2013.01); *H04L 67/1097* (2013.01); *H04L 69/40* (2013.01)

(56) References Cited

U.S. PATENT DOCUMENTS

| | | | |
|---|---|---|---|
| 2007/0180314 A1 | 8/2007 | Kawashima et al. | |
| 2007/0250410 A1* | 10/2007 | Brignone | G06Q 10/087 705/28 |
| 2009/0138753 A1 | 5/2009 | Tameshige et al. | |
| 2011/0145414 A1* | 6/2011 | Darling | G06F 15/161 709/226 |
| 2013/0268801 A1* | 10/2013 | Yamato | G06F 11/2028 714/4.11 |
| 2014/0115131 A1* | 4/2014 | Zhu | H04L 41/0893 709/221 |

FOREIGN PATENT DOCUMENTS

| | | |
|---|---|---|
| CN | 102970160 A | 3/2013 |
| CN | 103795553 A | 5/2014 |
| CN | 104468242 A | 3/2015 |
| CN | 204272157 U | 4/2015 |
| JP | 8-235132 | 9/1996 |
| JP | 2000-122982 A | 4/2000 |
| JP | 2003-228527 A | 8/2003 |
| JP | 2004-32103 A | 1/2004 |
| JP | 2007-233586 A | 9/2007 |
| JP | 2012-43445 A | 3/2012 |
| JP | 2014-116035 A | 6/2014 |
| WO | 2014/114119 A1 | 7/2014 |

OTHER PUBLICATIONS

Mo W., "A Hot Standby Scheme of Office Server Dual Server Based on Pure Soft by the Shandong Branch of Air Traffic Control Office", *Network Security Technology & Application* 10:124 (2 pages) (Oct. 31, 2013), together with an English-language abstract.

Zhao Y. et al., "Design of Hot-Standby Embedded Computer System", *Foreign Electronic Measurement Technology* 32(5):76 (5 pages) (May 31, 2013), together with an English-language abstract.

International Search Report dated Mar. 30, 2016 received from International Application No. PCT/CN2015/098079.

Extended European Search Report dated Jun. 6, 2018 received from the European Patent Office in related Application No. EP 15875116.4-1216.

* cited by examiner

US 10,379,976 B2

AUTOMATIC SWITCHING METHOD AND AUTOMATIC SWITCHING SYSTEM

CROSS-REFERENCE TO RELATED APPLICATIONS

This application is a national phase application of International Application PCT/CN2015/098079, filed Dec. 21, 2015, which is based upon and claims priority to Chinese Patent Application No. CN201410838463.5 filed Dec. 29, 2014, the entire contents of which are incorporated herein by reference.

TECHNICAL FIELD

The present disclosure generally relates to the field of distributed systems, and more particularly, to an automatic switching method and an automatic switching system.

BACKGROUND

A security inspection system includes a security inspection device provided in a security inspection station. The security inspection device is configured to scan a human body or an object carried by a person, and to send the scanned result to a system for managing security inspection, in order to prevent risks brought by contrabands. The system for managing security inspection may be a distributed system or a centralized system for managing security inspection. Generally, a distributed system for managing security inspection may include two identical sets of servers, core switches and some uncommon client terminals. One of the two sets is put into an operation environment, and the other is in a backup environment isolated from the operation environment. When the server in the operation environment fails, physical links to corresponding client terminals have to be reconnected to the system in the backup environment.

FIG. 1 is a method and a distributed system for switching between an operation server and a backup server in the related art. As shown in FIG. 1, the operation server is isolated from the backup server. In a normal state, a client terminal is connected to the operation server network. When a switching is required, the connection between the common client terminals and the current network in the operation environment has to be manually cut off, and the client terminals have to be reconnected to a network in the backup environment.

However, the existing method and the distributed system for switching between an operation server and a backup server in the related art quires additional network devices and uncommon client terminals. Therefore, the system has a complicated structure and costs highly. Moreover, it requires manual effort for the switching, and the switching process is complicated and prolonged.

SUMMARY

To overcome the defects in the related art, the present disclosure provides an automatic switching method and an automatic switching system in which the switching operation can be completed automatically. The switching process is highly efficient, safe, and it can improve the operation efficiency.

In one aspect, the present disclosure provides an automatic switching method, including:

an automatic switching device monitoring in real time a service state of an operation server;

when the automatic switching device monitors that the operation server has terminated providing service for a client terminal, the automatic switching device sending to the operation server a switching instruction for switching a current configuration of the operation server and sending to a backup server a notification message for switching a current configuration of the backup server; and the backup server switching the current configuration of the backup server to a preset first configuration according to the notification message, and providing service for the client terminal;

wherein the first configuration is the configuration of the operation server when the operation server provided service.

In an embodiment, the method further includes:

the operation server switching the current configuration of the operation server to a preset second configuration, and sending a feedback message to the automatic switching device.

In an embodiment, the method further includes:

when the automatic switching device monitors that the operation server has terminated providing service for a client terminal, the automatic switching device sending to the client terminal a server switching prompt message for prompting a user of the client terminal that the operation server is being switched.

In an embodiment, the client terminal receiving service from the operation server includes: a common client terminal and a first uncommon client terminal;

the client terminal receiving service from the backup server includes: said common client terminal and a second uncommon client terminal;

the second uncommon client terminal corresponds to the first uncommon client terminal;

when the automatic switching device monitors that the operation server has terminated providing service for a client terminal, the automatic switching device triggering the second uncommon client terminal to be started;

and/or;

correspondingly, sending to the client terminal a server switching prompt message includes:

sending to the common client terminal the server switching prompt message for prompting the user of the client terminal that the operation server is being switched.

In an embodiment, the operation server and the backup server can communicate with the client terminal at the same time.

In an embodiment, before or after the backup server switching the current configuration of the backup server to a preset first configuration, and providing service for the client terminal, the method further includes:

a network device connected to the operation server switching a current configuration of the network device to a preset third configuration, to enable the backup server to perform data communication with the client terminal and provide service for the client terminal.

In an embodiment, the network device connected to the operation server switching a current configuration of the network device to a preset third configuration includes:

when the automatic switching device monitors that the operation server has terminated providing service for a client terminal, the automatic switching device sending to the network device a notification message to the network device for enabling the backup server to provide service for the client terminal; and the network device switching the current configuration of the network device to the preset third configuration.

In an embodiment, the operation server and the backup server cannot communicate with the client terminal at the same time.

In one aspect, the present disclosure provides an automatic switching method, including:

an automatic switching device monitoring in real time a service state of an operation server;

when the automatic switching device monitors that the operation server has terminated providing service for a client terminal, the automatic switching device sending to a network device connected to the operation server a switching instruction for switching a current configuration of the network device;

the network device switching the current configuration to a preset third configuration according to the switching instruction, to enable a backup server to perform data communication with the client terminal, wherein the third configuration of the network device is a configuration which enables the backup server to provide service for the client terminal.

In an embodiment, the method further includes:

when the automatic switching device monitors that the operation server has terminated providing service for a client terminal, the automatic switching device sending to the client terminal a server switching prompt message for prompting a user of the client terminal that the operation server is being switched.

In an embodiment, the operation server and the backup server cannot communicate with the client terminal at the same time.

In one aspect, the present disclosure provides an automatic switching system, including:

an automatic switching device, at least one client, an operation server providing service for the at least one client, a backup server providing service for the client terminal when the operation server has terminated providing service for the client terminal; the operation server is physically connected to the backup server; when the automatic switching device monitors that the operation server has terminated providing service for a client terminal, the automatic switching device sending to the operation server a switching instruction for switching a current configuration of the operation server and sending to the backup server a notification message for switching a current configuration of the backup server, such that the backup server provides service for the client terminal.

In an embodiment, the system includes:

a network device, the client terminal communicates with the operation server via the network device; and when the automatic switching device monitors that the operation server has terminated providing service for a client terminal, the automatic switching device notifying the network device to switch a current configuration of the automatic switching device to a configuration which enables the backup server to communicate with the at least one client terminal, such that the backup server provides service for the at least one client terminal.

It can be seen from the above technical solution, in the automatic switching method and the automatic switching system, when the operation server has terminated providing service for the client terminal, the automatic switching device sends to the operation server a switching instruction for switching a current configuration of the operation server and sends to a backup server a notification message for switching a current configuration of the backup server; and the backup server switches the current configuration of the backup server to a preset first configuration according to the notification message, and provides service for the client terminal. In this way, the switching operation can be completed automatically, and the whole switching process is highly efficient and safe. It can reduce time for switching operation and significantly improve the efficiency of the switching operation.

BRIEF DESCRIPTION OF THE DRAWINGS

In order to illustrate the technical solutions of the embodiments of the present disclosure or in the related art more clearly, a brief introduction may be given hereinafter to the accompanying drawings that may be used in the description of the embodiments or of the related art. Apparently, the drawings in the description below are merely for illustrating some embodiments of the present disclosure, and other drawings may be obtained by those skilled in the art according to these drawings without paying any creative labor.

DETAILED DESCRIPTION

A clear and thorough description will be given to the technical solution of the present disclosure with reference to the accompanying drawings of the present disclosure. However, the illustrated embodiments are not all of the embodiments of the present disclosure, but only a part of them. According to the embodiments of the present disclosure, all of the other embodiments obtained by those skilled in the art without consuming any creative work fall within the protection scope of the present disclosure.

The embodiments of the present disclosure are mainly applied in a security inspection system, such as a security inspection system in an airport, a ship lockage, a subway or a bus station. Specifically, the following client terminal can be a security inspection device or a first personal computer (PC) for receiving scanned data sent by the security inspection device. An operation server may be a second PC in communication with the first PC in the same machine room.

The second PC can determine whether an object is dangerous based on the data sent by the first PC. A backup server can be a third PC in communication with the security inspection device when the second PC fails. An automatic switching device can be another PC for monitoring states of the device for security inspection, the first PC, the second PC and the third PC, or can drive the agent software installed in the device for security inspection, the first PC, the second PC and the third PC for monitoring and switching purpose.

Figure 1:
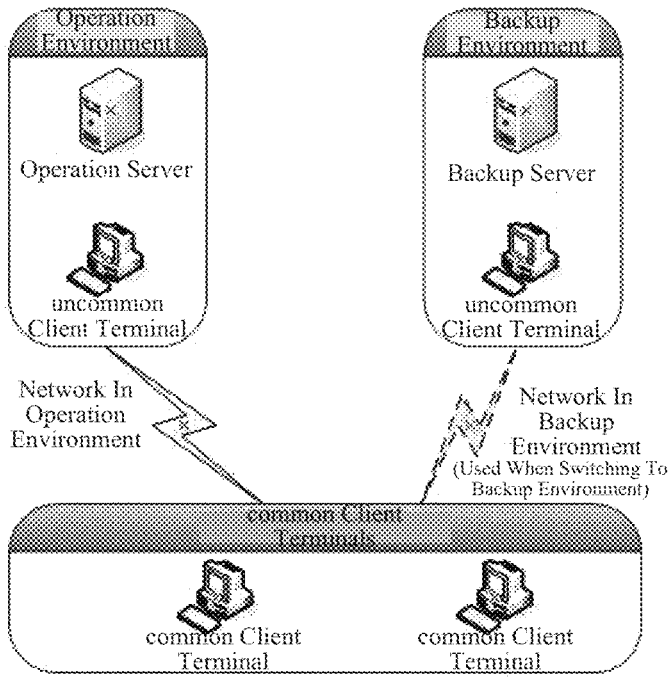
FIG. 1 is a schematic diagram of a distributed system in the related art.
Figure 2:
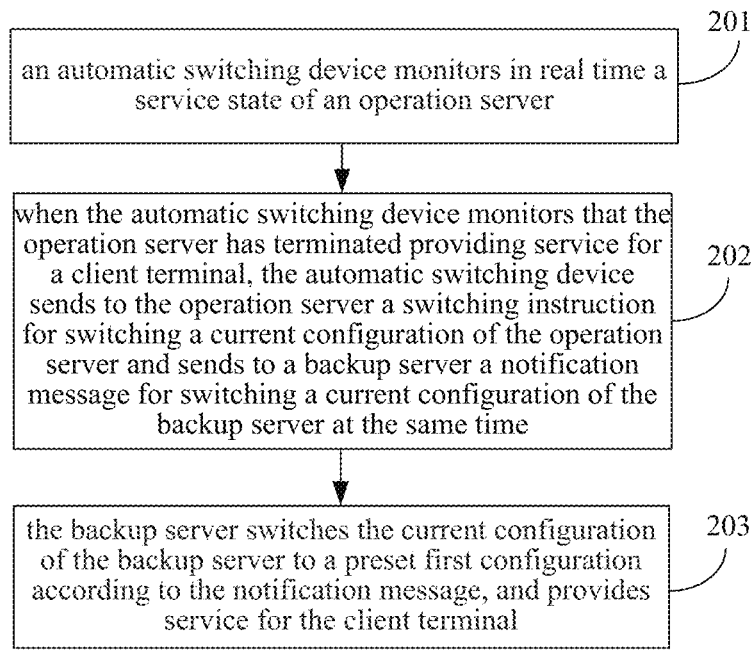
FIG. 2 is a flowchart illustrating an automatic switching method provided by an embodiment of the present disclosure.

FIG. 2 is a flowchart illustrating an automatic switching method provided by an embodiment of the present disclosure. As shown in FIG. 2, the automatic switching method provided by the embodiment of the present disclosure can include the following steps.

At step 201, an automatic switching device monitors in real time a service state of an operation server.

In the present embodiment, the client terminal sends security inspection information to the operation server. The operation server performs corresponding security inspection operation, records a security inspection result and returns the security inspection result to the client terminal.

At step 202, when the automatic switching device monitors that the operation server has terminated providing service for a client terminal, the automatic switching device sends to the operation server a switching instruction for switching a current configuration of the operation server and sends to a backup server a notification message for switching a current configuration of the backup server.

For example, the configuration can be an Internet Protocol (IP) address, a utilized source, a started service, and so on, which is not specifically limited by the embodiment of the present disclosure.

At step 203, the backup server switches the current configuration of the backup server to a preset first configuration according to the notification message, and provides service for the client terminal.

In the embodiment, the first configuration is the configuration of the operation server when the operation server provided service.

In the embodiment, after the operation server switches its current configuration to a preset second configuration, the operation server is put into a waiting state. After the backup server switches its current configuration to the preset first configuration, the backup server is put into a service state.

In the embodiment, the first configuration correspond to the current configuration of the operation server, such as a particular IP address, a particular utilized source, a particular started service, and so on.

At step 201, the automatic switching device monitors in real time the service state of the operation server. In a normal state, a client terminal accesses the operation server. When security inspection data sent from the client terminal meets an alarm condition, the operation server sends an alarm to an alarm system. When the operation server fails or a personal initiates a switching task, the operation server terminates providing the service, and thus the client terminal cannot access the operation server.

In the present embodiment, the automatic switching device includes a driving agent apparatus provided in the operation server and the backup server.

At step 202, when the automatic switching device monitors that the operation server has terminated providing service for the client terminal, the automatic switching device sends to a driving agent apparatus provided inside the backup server a notification message for switching a current configuration of the backup server. Upon receiving the notification message, the driving agent apparatus triggers the backup server to switch the current configuration according to the notification message.

At step 203, the client terminal receiving service from the operation server includes: a common client terminal and a first uncommon client terminal. The client terminal receiving service from the backup server includes: said common client terminal and a second uncommon client terminal which corresponds to the first uncommon client terminal.

Upon monitoring that the operation server has terminates providing service for the client terminal, the automatic switching device triggers the second uncommon client terminal to be started.

In practical application, the operation server and the backup server can be in communication with the client terminal at the same time. The current configuration of the operation server is different from the current configuration of the backup server. In a normal state, the client terminal accesses the operation server. When the operation server fails, the operation server terminates providing service. Then, the automatic switching device sends to the operation server a switching instruction for switching the current configuration of the operation server, and sends a notification message to the backup server for switching the current configuration of the backup server. As a result, the backup server switches the current configuration of the backup server to a preset first configuration and the backup server replaces the operation server to provide service for the client terminal.

After the security inspection finishes, the client terminal updates the most recent security inspection result to a database connected to the backup server.

The communication between the client terminal and the backup server can be automatically realized through network mechanism. The switching of the configuration includes switching of an IP address. After the backup server switches the current configuration to a particular IP address, data packages sent by the client terminal will be automatically sent to the backup server.

In the present embodiment, when the backup server is started to provide service for the client terminal, the backup server can send a prompt message notifying that the switching has been completed. When the client terminal receives the prompt message notifying that the switching has been completed, it means that the switching has been completed.

The security inspection system applicable in the embodiment can be provided with one operation server and a plurality of backup servers. When the operation server fails, the backup servers can share the tasks among them, and the load is allocated again.

Optionally, before or after the step 202, the above method can also include a step 202a not shown in the figures.

At step 202a, when the automatic switching device monitors that the operation server has terminated providing service for a client terminal, the automatic switching device sends to the client terminal a server switching prompt message for prompting a user of the client terminal that the operation server is being switched. At this time, after the client terminal receives the server switching prompt message, the client terminal can backup current inspection information if necessary.

It should be noted that, the server switching prompt message sent to the client terminal can be any type of instruction message for instructing the client terminal to perform an operation, such as an alarm notice notifying that that operation server fails, an instruction for prompting the client terminal to store data, a message notifying a service state of the operation server, and so on. The server switching prompt message can be displayed by an information indication apparatus connected to the security inspection device. The server switching prompt message can be set depending on application, which is not specifically limited by the embodiment.

In the embodiment, the automatic switching device sends a server switching prompt message to a common client terminal, and the client terminal performs corresponding operation or prompting according to specific instruction in the a switching prompt message, such as storing data or cancelling current operation, and so on.

Optionally, before or after step 203, the above method can also include a step 203a not shown in the figures.

At step 203a, a network device connected to the operation server switches a current configuration of the network device to a preset third configuration, to enable the backup server to provide service for the client terminal.

In the embodiment, the operation server and the backup server are connected to the network device via a physical link. The configuration of the network device needs to be switched to enable the backup server to communicate with the client terminal through the network device.

For example, the network device can be a router, a network exchanger, and the like.

In the embodiment, the configuration of the network device can be a configuration regarding division of Virtual Local Area Network (VLAN). After the network device switches its current configuration, the backup server and the client terminal are in the same VLAN. Through the network mechanism, a data package sent by the client terminal will be automatically sent to the backup server. Since the client terminal and the backup server can communication security inspection data, the tasks and risks in the security inspection system can be reasonably distributed, and the security level and efficiency of the security inspection system can be improved.

In the present embodiment, when server switching is required, the operation server terminates providing service. The current configuration of the operation server is switched to a preset second configuration, and the current configuration of the operation server is switched to a preset first configuration. Then, the backup server can provide service for the client terminal, and the client terminal can automatically communicate with the backup server through the network mechanism. In this way, a manual switching effort is eliminated, and the switching efficiency can be improved.

Figure 3:
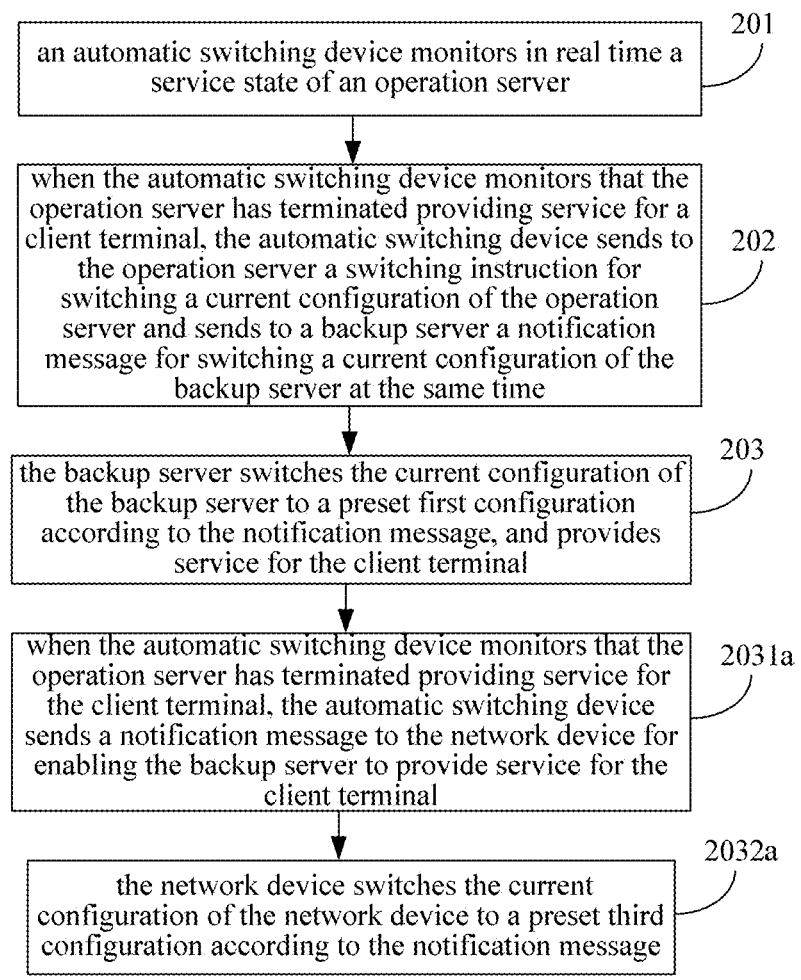
FIG. 3 is a flowchart illustrating a part of the steps of the automatic switching method provided by an embodiment of the present disclosure.

FIG. 3 is a flowchart illustrating a part of the steps of the automatic switching method provided by an embodiment of the present disclosure. Specifically, FIG. 3 shows a process of the above step 203a. As shown in FIG. 3, the above step 203a specifically includes the following steps.

At step 2031a, when the automatic switching device monitors that the operation server has terminated providing service for the client terminal, the automatic switching device sends a notification message to the network device for enabling the backup server to provide service for the client terminal.

For example, after the automatic switching device monitors that the operation server has terminated providing service for the client terminal, the automatic switching device sends to a driving agent apparatus inside the network device a notification message for switching a configuration of the network device. Upon receiving the notification message, the driving agent apparatus triggers the network device for the network device to switch the current configuration according to the notification message.

At step 2032a, the network device switches the current configuration of the network device to a preset third configuration according to the notification message.

In the present embodiment, when server switching is required, the operation server terminates providing service. The current configuration of the network device is switched to a preset third configuration, to arrange the client terminal and the backup server in the same VLAN and enable the backup device to provide service for the client terminal. Then, the backup server can provide service for the client terminal, and the client terminal can automatically communicate with the backup server through the network mechanism. In this way, a manual switching effort is eliminated, and the switching efficiency can be improved.

Figure 4:
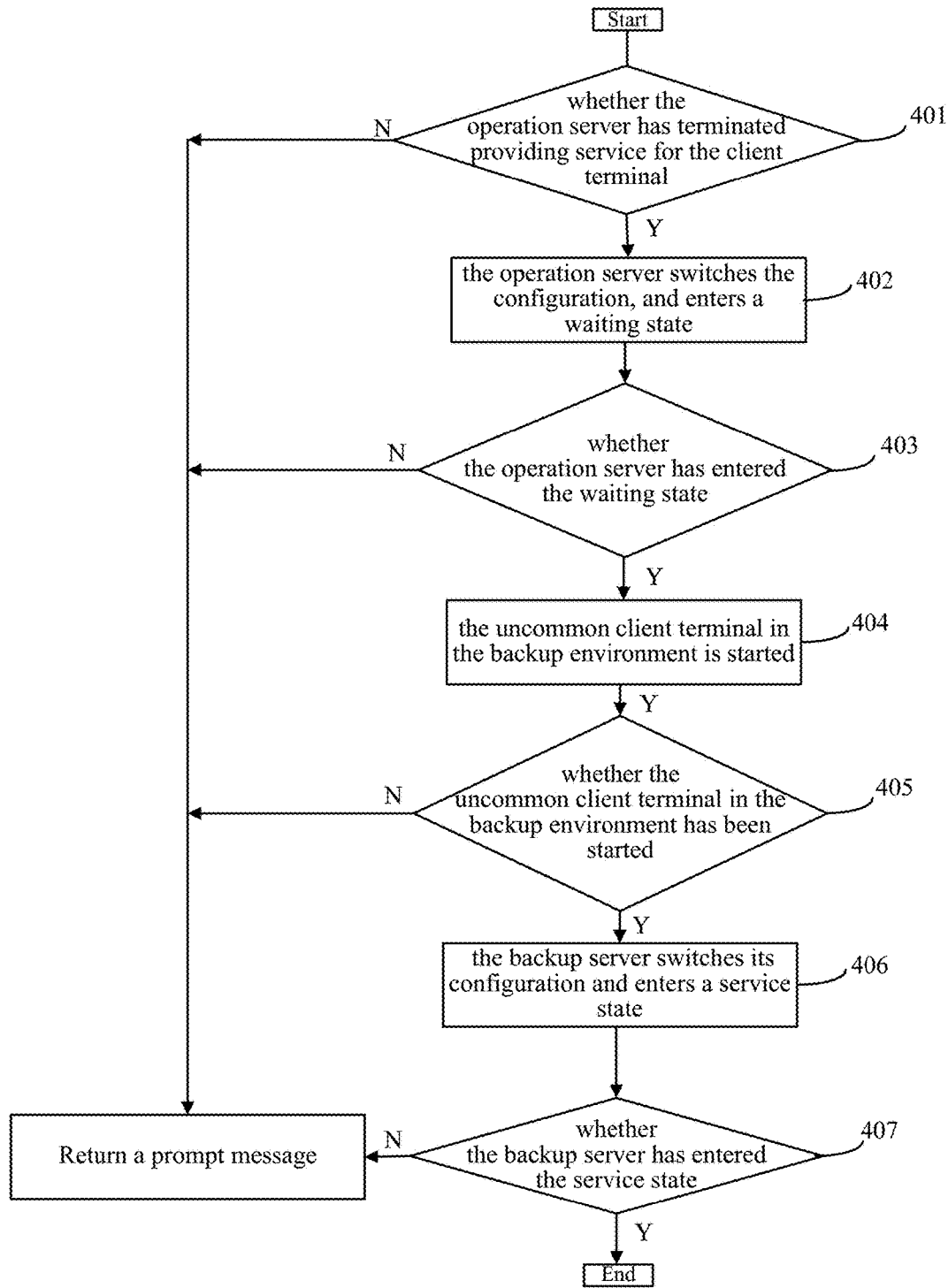
FIG. 4 is a flowchart illustrating an automatic switching method provided by an embodiment of the present disclosure.

FIG. 4 is a flowchart illustrating an automatic switching method provided by an embodiment of the present disclosure. As shown in FIG. 4, the automatic switching method of the present embodiment specifically includes the following steps.

At step 401, the automatic switching device monitors whether the operation server has terminated providing service for the client terminal.

In the embodiment, if the automatic switching device monitors that the operation server has terminated providing service for the client terminal, the automatic switching device sends to the operation server a switching instruction for switching the current configuration of the operation server; otherwise, a prompt message is returned to the automatic switching device.

At step 402, the operation server switches the configuration, and enters a waiting state.

In the embodiment, after the operation server receives the switching instruction, operation server switches the current configuration of the operation server to a preset second configuration and enters a waiting state.

At step 403, it is determined whether the operation server has entered the waiting state.

In practical application, the automatic switching device receives a feedback message indicating that the configuration of the operation server has been switched to the waiting state, and determines whether the operation server has entered the waiting state. If the operation server fails to enter the waiting state, the operation server returns a message to the automatic switching device.

At step 404, after the operation server has switched the configuration and has entered the waiting state, the uncommon client terminal in the backup environment is started.

After the operation server has entered the waiting state, the operation server sends a feedback message to the automatic switching device.

At step 405, it is determined whether the uncommon client terminal in the backup environment has been started.

At step 406, after the uncommon client terminal has been started, the backup server switches its configuration and enters a service state.

The backup server switches the current configuration of the backup server to a preset first configuration according to the notification message sent by the automatic switching device and enters the service state.

In the embodiment, after the operation server switches the configuration and enters the waiting state, the automatic switching device sends a corresponding notification message to the backup server. Then, the backup server switches the current configuration of the backup server to the preset first configuration according to the notification message.

At step 407, it is determine whether the backup server has entered the service state.

In practical application, after the backup server switches the current configuration to the preset first configuration, the backup server enters the service state. Then, the backup server can receive and store security inspection data set from the client terminal and provide service for the client terminal. The client terminal can automatically communicate with the backup server through network mechanism. If the backup server fails to switch the configuration and thus fails to enter the service state, the backup server can return a prompt message to the automatic switching device.

In the embodiment, the client terminal can automatically communicate with the backup server through network mechanism. In this way, it can eliminate manual effort for the switching operation and reduce switching time.

Figure 5:
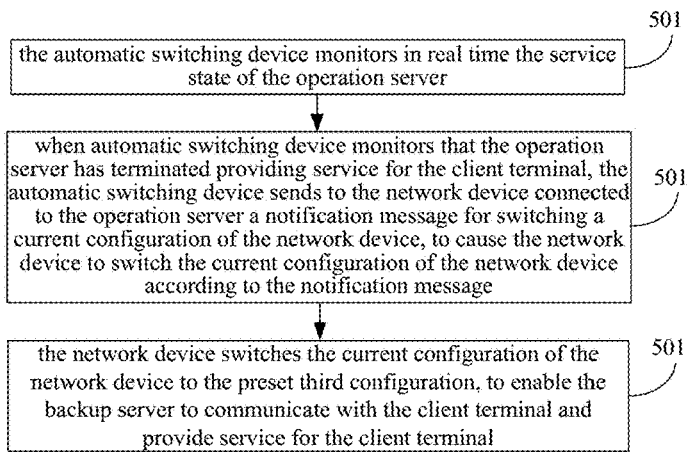
FIG. 5 is a flowchart illustrating an automatic switching method provided by another embodiment of the present disclosure.

FIG. 5 is a flowchart illustrating an automatic switching method provided by another embodiment of the present disclosure. As shown in FIG. 5, the automatic switching method provided by the embodiment of the present disclosure includes the following steps.

At step 501, the automatic switching device monitors in real time the service state of the operation server.

At step 502, when the automatic switching device monitors that the operation server has terminated providing service for the client terminal, the automatic switching device sends to the network device connected to the operation server a notification message for switching a current configuration of the network device, to cause the network device to switch the current configuration of the network device according to the notification message.

For example, the network device can be a router, an exchanger or other kind of network device.

At step 503, the network device switches the current configuration of the network device to the preset third configuration, to enable the backup server to provide service for the client terminal.

It should be noted that, the operation server and the backup server cannot communicate with the client terminal at the same time. The configurations of the operation server and the backup server may be the same, but belongs to different VLANs.

In the embodiment, the third configuration of the network device is a configuration to enable the backup server to provide service for the client terminal, such as a particular IP address, a utilized particular source, a started particular service and so on, which may be set as desired.

In the present embodiment, the configuration of the network device can be a configuration regarding division of the VLAN. After the network device has switched its current configuration, the backup server and the client terminal are in the same VLAN, and the operation server is in another VLAN. Through the network mechanism, a data package sent by the client terminal will be automatically sent to the backup server.

Optionally, before or after the step 502, the above method can also include a step 504 not shown in the figures.

At step 504, when the automatic switching device monitors that the operation server has terminated providing service for the client terminal, the automatic switching device sends to the client terminal a server switching prompt message for prompting a user of the client terminal that the operation server is being switched.

It should be noted that, the server switching prompt message sent to the client terminal can be any type of instruction message for instructing the client terminal to perform an operation, such as an alarm notice notifying that that operation server fails, an instruction for prompting the client terminal to store data, a message notifying a service state of the operation server, and so on. The server switching prompt message can be set depending on application, which is not specifically limited by the embodiment.

In the embodiment, after the client terminal receives the server switching prompt message, the automatic switching device can control the operation server to be cut off. In this way, the client terminal will not be affected during the process of switching to connection to the backup server. It can improve the stability of the process.

In practical application, after the client terminal receives the server switching prompt message, the operation server terminates operation, and the backup server is started to provide service. The network device switches the current configuration of the network device to the preset third configuration, and connects the client terminal and the backup server to the same VLAN, and switch the operation server to other VLAN. Then, the switching operation is completed.

The automatic switching method of the embodiment, the switching operation can be completed by switching the configuration of the network device. It can reduce time for switching operation, simplify the system, and significantly improve the efficiency of the switching operation.

Figure 6:
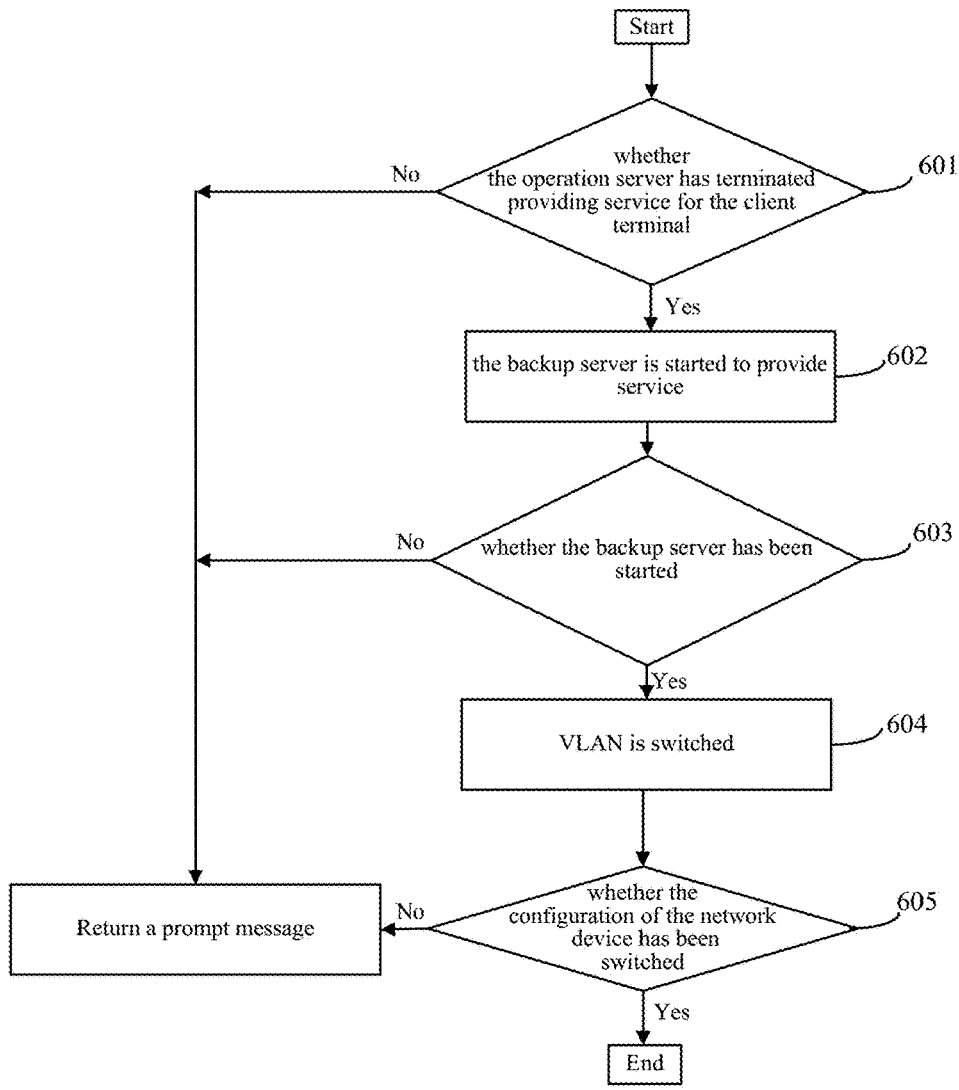
FIG. 6 is a flowchart illustrating an automatic switching method provided by another embodiment of the present disclosure.

FIG. 6 is a flowchart illustrating an automatic switching method provided by another embodiment of the present disclosure. As shown FIG. 6, the method specifically includes the following steps.

At step 601, the automatic switching device monitors whether the operation server has terminated providing service for the client terminal.

At step 602, the backup server is started to provide service.

In the present embodiment, when the operation server terminates providing service, the backup server is started.

At step 603, it is determined whether the backup server has been started.

In practical application, after the operation server terminates providing service, the uncommon client terminal in the backup environment is started. After the uncommon client terminal has been started, the backup server enters the service state. Otherwise, a prompt message is returned to the automatic switching device.

At step 604, the configuration of the network device is switched.

For example, the configuration of the network can be a configuration regarding division of VLAN. The automatic switching device sends a corresponding instruction to the network device, to cause the network device to switch the current configuration to a preset third configuration.

At step 605, it is determined whether the configuration of the network device has been switched.

In the embodiment, after the current configuration of the network device is switched to the preset third configuration, the backup server and the client terminal is in the same VLAN. Through network mechanism, a data package sent from the client will be automatically sent to the backup server. After the client terminal receives a message notifying the switching has been completed, the switching operation is completed. Otherwise, a prompt message is returned to the automatic switching device.

The automatic switching method of the present embodiment, the switching operation can be completed by switching the configuration of the network device. It can reduce the time for switching operation, and can simplify the system.

Figure 7:
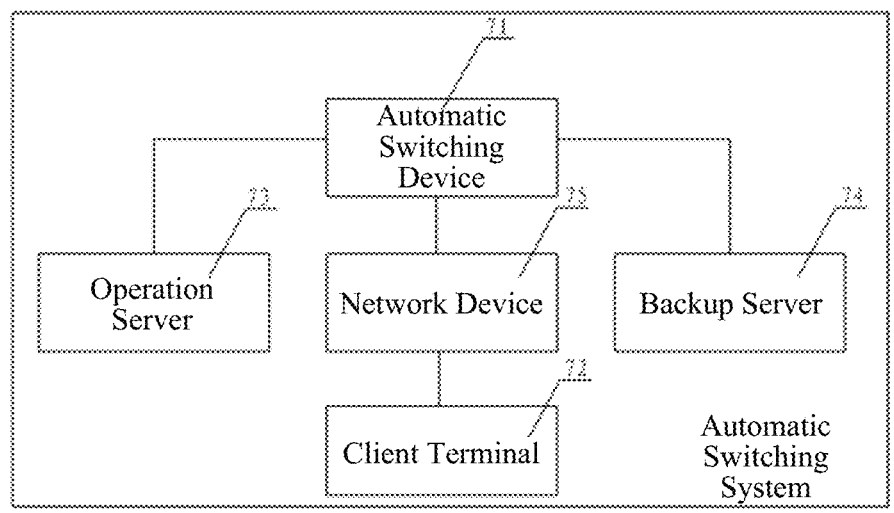
FIG. 7 is a block diagram illustrating an automatic switching system provided by an embodiment of the present disclosure.
Figure 8:
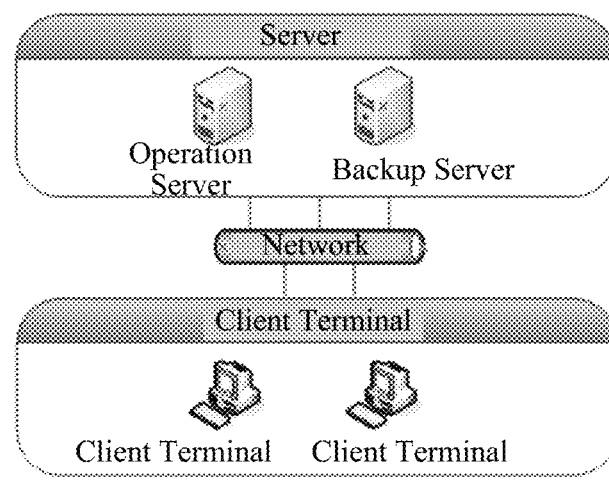
FIG. 8 is a schematic diagram illustrating an automatic switching system provided by an embodiment of the present disclosure.

FIG. 7 is a block diagram illustrating an automatic switching system provided by an embodiment of the present disclosure. FIG. 8 is a schematic diagram illustrating the automatic switching system as shown in FIG. 7. As shown in FIGS. 7 and 8, the automatic switching system of the present embodiment includes: an automatic switching device 71, at least one client terminal 72, an operation server 73 providing service for the at least one client terminal and a backup server 74 for providing service for the client terminal when the operation server 73 terminates providing service for the client terminal. The operation server 73 is physically connected to the backup server 74. When the automatic switching device 71 monitors that the operation server 73 terminates providing service for the client terminal 72, the automatic switching device 71 sends to the operation server 73 a switching instruction for switching the current configuration of the operation server 73, and sends to the backup server 74 a notification message for switching the current configuration of the backup server 74, to cause the backup server 74 to switch the current configuration to a configuration which enables the backup server 74 to provide service for the client terminal 72 and enables the backup server 74 to communicate with the at least one client terminal 72. At this time, the operation server 73 switches its current configuration to a preset second configuration and enters waiting state.

In practical application, when the operation server 73 terminates providing service for the client terminal 72, the automatic switching device 71 causes the operation server 73 to switch its current configuration to a preset second configuration, and causes the backup server 74 to switch its current configuration to a preset first configuration and to provide service for the client terminal 72.

In another embodiment, the automatic switching system also includes a network device 75.

The client terminal 72 is connected to the operation server 73 through the network device 75.

When the automatic switching device 71 monitors that the operation server 73 terminates providing service for the client terminal 72, the automatic switching device 71 notifies the network device to switch the current configuration of the network device to a configuration which enables the backup server 74 to provide service for the at least one client terminal 72.

The network device 75 is configured to switch the current configuration to a preset third configuration to enable the backup server 74 to provide service for the client terminal 72.

The automatic switching system of the present embodiment can perform the process in the method embodiments as shown in FIGS. 2 to 4, which will not be elaborated in the present embodiment.

In the automatic switching system of the present embodiment, the operation server and the backup server have different configurations. When server switching is required, the operation server terminates providing service and switches its configuration to enter the waiting state. At the same time, the backup server switches its configuration and replaces the operation server to provide service for the client terminal. It does not require additional room for equipping devices, and it reduces operations for coordinate and preparation for the switching servers.

Figure 9:
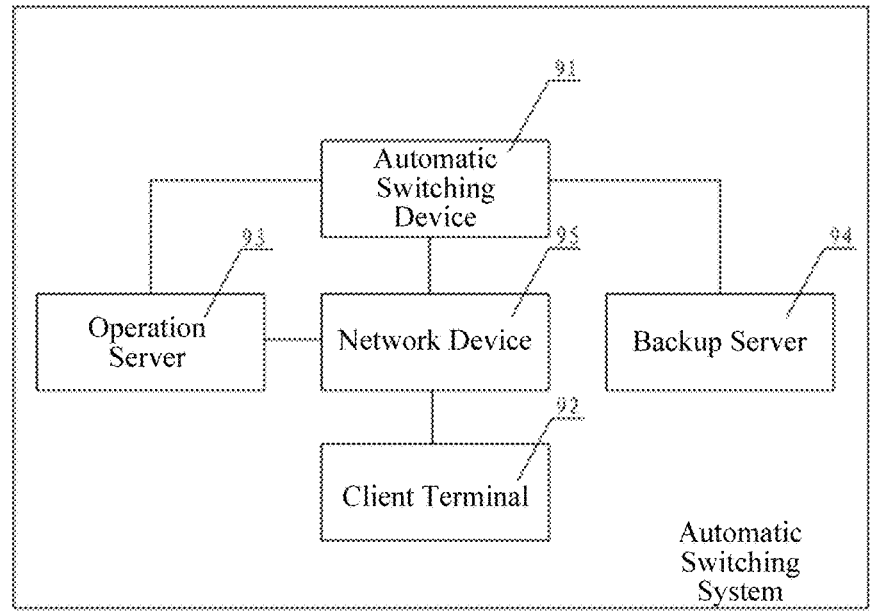
FIG. 9 is a block diagram illustrating an automatic switching system provided by another embodiment of the present disclosure.
Figure 10:
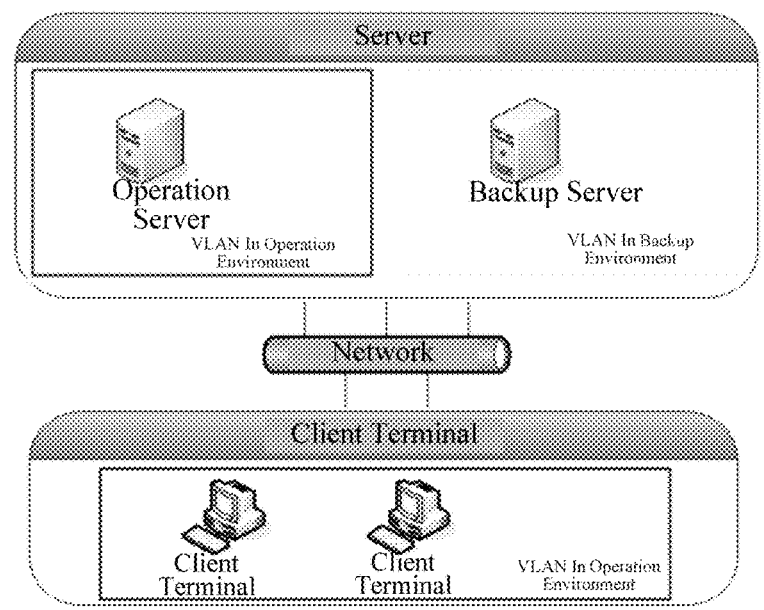
FIG. 10 is a schematic diagram illustrating an automatic switching system provided by another embodiment of the present disclosure.

FIG. 9 is a block diagram illustrating an automatic switching system provided by another embodiment of the present disclosure. FIG. 10 is a schematic diagram illustrating the automatic switching system as shown in FIG. 9.

As shown in FIGS. 9 and 10, the automatic switching system in the present embodiment includes: an automatic switching device 91, at least one client terminal 92, an operation server 93 providing service for the at least one client terminal 92, a backup server 94 for providing service for the client terminal 92 when the operation server 93 terminates providing service for the client terminal 92, and a network device 95 connected to the operation server 93.

When the operation server 93 terminates providing service for the client terminal 92, the automatic switching device 91 causes the network device 95 to switches its current configuration to a third configuration which enables the backup server 94 to provide service for the client terminal 92.

The automatic switching system can perform the process in the method embodiments as shown in FIGS. 5 to 6, which will not be elaborated in the present embodiment.

Compared with the system in the related art, the automatic switching system of the present embodiment does not require a separate backup server network and preparation of a uncommon client terminal. The switching operation can be completed by switching the current configuration of the network device to a preset third configuration, and switching the client terminal and the backup server to the same VLAN, switching the operation server to other VLAN. It can reduce system devices, simplify the system and lower the cost.

In the embodiment, both of reliability and a reasonability cost of the security inspection system can be taken into account. The backup server is independent from the operation server. In a normal state, the client terminal accesses the operation server. When the operation server fails, the client terminal accesses the backup server through an exchanger router. The backup server and the operation server are isolated from each other at the network level. In this way, when the operation server fails unpredictably, the entire security inspection system can also be operated.

Those skilled in the art can readily modify and alter the present disclosure without departing the spirit and scope of the present disclosure. Therefore, such modification and alteration of the present disclosure belong to the scope of the claims and their equivalent, and the present disclosure intends to cover such modification and alteration.

What is claimed is:

1. An automatic switching method, wherein the method comprises:

an automatic switching device monitoring in real time a service state of an operation server that operates in a preset first configuration;

when the automatic switching device monitors that the operation server has terminated providing service for a client terminal system, the client terminal system comprising at least a first device and another device, the automatic switching device sending to the client terminal system a server switching prompt message for prompting a user of the client terminal system that the operation server is being switched, sending to the operation server a switching instruction for switching a current configuration of the operation server and sending to a backup server a notification message for switching a current configuration of the backup server; and the backup server switching the current configuration of the backup server to the preset first configuration according to the notification message, and providing service for another client terminal system, the another client terminal system comprising at least the first device and an other device, wherein the other device in the another client terminal system serves as a backup for the another device in the client terminal system;

wherein the preset first configuration is the configuration of a server when the server provides service, and wherein before or after the step of the backup server switching the current configuration of the backup server to the preset first configuration, and providing service for another client terminal system, the method further comprises:
a network device connected to the operation server switching a current configuration of the network device to a preset configuration for the network device and establishing a data communication between the another client terminal system and the backup server, to enable the backup server to perform the data communication with the another client terminal system and provide service for the another client terminal system,
the method further comprises:
when the automatic switching device monitors that the operation server has terminated providing service for the client terminal system receiving service from the operation server, the automatic switching device triggers the other device in the another client terminal system to be started;
and/or
correspondingly, sending to the first device in the client terminal system the server switching prompt message for prompting the user of the client terminal system that the operation server is being switched,
wherein the preset configuration for the network device is a configuration which enables the backup server to provide service for the another client terminal system.

2. The method of claim 1, wherein the method further comprises:
the operation server switching the current configuration of the operation server to a preset second configuration, and the operation server sending a feedback message to the automatic switching device,
wherein the preset second configuration is the configuration for enabling a server to enter a waiting state.

3. The method of claim 1, wherein the operation server and the backup server are capable of communicating with the client terminal system at the same time.

4. The method of claim 1, wherein the network device connected to the operation server switching a current configuration of the network device to a preset configuration of the network device comprises:
when the automatic switching device monitors that the operation server has terminated providing service for the client terminal system, the automatic switching device sending to the network device a notification message to the network device for establishing the data communication between the another client terminal system and the backup server and enabling the backup server to provide service for the another client terminal system; and
the network device switching the current configuration of the network device to the preset configuration of the network device.

5. The method of claim 1, wherein the operation server and the backup server are not capable of communicating with the client terminal system at the same time.

6. The method of claim 2, wherein the operation server and the backup server are capable of communicating with the client terminal system at the same time.

7. The method of claim 4, wherein the operation server and the backup server are not capable of communicating with the client terminal system at the same time.

8. An automatic switching method, wherein the method comprises:
an automatic switching device monitoring in real time a service state of an operation server that operates in a preset first configuration;
when the automatic switching device monitors that the operation server has terminated providing service for a client terminal system, the client terminal system comprising at least a first device and another device, the automatic switching device sending to the client terminal system a server switching prompt message for prompting a user of the client terminal system that the operation server is being switched and sending to a network device connected to the operation server a switching instruction for switching a current configuration of the network device;
the network device switching the current configuration to a preset configuration for the network device according to the switching instruction and establishing a data communication between another client terminal system and a backup server, to enable the backup server to perform data communication with the another client terminal system, the another client terminal system comprising at least the first device and an other device, wherein the other device in the another client terminal system serves as a backup for the another device in the client terminal system,
the method further comprises:
when the automatic switching device monitors that the operation server has terminated providing service for the client terminal system receiving service from the operation server, the automatic switching device triggers the other device in the another client terminal system to be started;
and/or
correspondingly, sending to the first device in the client terminal system the server switching prompt message for prompting the user of the client terminal system that the operation server is being switched,
wherein the preset configuration for the network device is a configuration which enables the backup server to provide service for the another client terminal system,
wherein the preset first configuration is the configuration of a server when the server provides service.

9. The method of claim 8, wherein the operation server and the backup server are not capable of communicating with the client terminal system at the same time.

10. The method of claim 8, wherein the operation server and the backup server are not capable of communicating with the client terminal system at the same time.

11. An automatic switching system, wherein the system comprises:
an automatic switching device,
at least two client terminal systems,
an operation server providing service for one of the at least two client terminal systems, a backup server providing service for another one of the at least two client terminal systems when the operation server has terminated providing service for the one of the at least two client terminal systems, the one of the at least two client terminals comprising at least a first device and another device, the operation server is physically connected to the backup server; and
a network device, the one of the at least two client terminal systems communicates with the operation server via the network device, when the automatic switching device monitors that the operation server has terminated providing service for the one of the at least two client terminal systems, the automatic switching device sending to the operation server a switching instruction for switching a current configuration of the operation server to a preset second configuration and sending to the backup server a notification message for switching a current configuration of the backup server to a preset first configuration, such that the backup server provides service for the another one of the at least two client terminal systems, the another one of the at least two client terminal systems comprising at least the first device and an other device, wherein the other device in the another one of the at least two client terminal systems serves as a backup for the another device in the one of the at least two client terminal systems, when the automatic switching device monitors that the operation server has terminated providing service for the one of the at least two client terminal systems, the automatic switching device notifying the network device to switch a current configuration of the automatic switching device to a configuration and establish a data communication between the another one of the at least two client terminal systems and the backup server, which enables the backup server to communicate with the another one of the at least two client terminal systems, such that the backup server provides service for the another one of the at least two client terminal systems, the automatic switching device further triggers the other device in the another one of the at least two client terminal systems to be started, wherein the preset first configuration is the configuration of a server when the server provides service and the preset second configuration is the configuration for enabling a server to enter a waiting state.

* * * * *